United States Patent [19]

Paul

[11] 4,071,450
[45] Jan. 31, 1978

[54] PRECIPITATION OF IRON RELATED COLOR BODIES

[75] Inventor: Stewart N. Paul, Mississauga, Canada

[73] Assignee: Chemed Corporation, Cincinnati, Ohio

[21] Appl. No.: 749,625

[22] Filed: Dec. 13, 1976

[51] Int. Cl.² .............................................. C02B 1/20
[52] U.S. Cl. ........................................ 210/53; 210/54
[58] Field of Search ................. 210/42 R, 43, 45, 47, 210/51–54, 59

[56] References Cited

U.S. PATENT DOCUMENTS

| | | | |
|---|---|---|---|
| 1,819,462 | 8/1931 | Grossman | 210/43 |
| 1,878,525 | 9/1932 | Kaplan | 210/45 |
| 1,915,040 | 6/1933 | Urbain | 210/43 |
| 3,377,274 | 4/1968 | Burke et al. | 210/53 |
| 3,868,320 | 2/1975 | Hider et al. | 210/45 |

*Primary Examiner*—Charles N. Hart
*Assistant Examiner*—Peter A. Hruskoci
*Attorney, Agent, or Firm*—Charles L. Harness

[57] ABSTRACT

Clarification of iron waste waters using basic dyes such as methylene blue, methyl violet or malachite green and the like, alone or in combination with organic or inorganic additives.

8 Claims, No Drawings

PRECIPITATION OF IRON RELATED COLOR BODIES

The present invention is directed to treatment of iron waste water, containing particles of iron oxides and hydroxides in various combinations and in various stages of oxidation. Waters of this type result from mining operations in which beneficiation operations produce waste waters containing iron compounds, especially tailing water from iron ore mines. Similar waste waters result in operating steel mills and the like. These waters contain red and red-brown particles finely dispersed and somewhat colloidal, which do not settle out by themselves. Thus the waste waters on being discharged into receiving streams may pollute the streams for great distances.

It has now been found that comparatively small amounts of blue or green basic dyes such as methylene blue, methyl violet, malachite green, and the like effectively and economically precipitate these colored particles, and yield an aqueous effluent that can be discharged into streams and lakes without discoloration. The precipitate is believed to form because these basic dyes have a cationic charge and are substantive to the negatively charged red color bodies. The dye should be blue or green to permit ready blending of the treated effluent with the receiving stream. Pretreatment of the waste waters with other compounds as settling aids, such as aluminum or iron salts, or organic compounds such as quaternary ammonium salts and their related polymers may be beneficial, but is not necessary. In addition to conventional pretreatment procedures, post-treatment with conventional flocculation chemicals can assist and speed up the sedimentation process.

The amount of basic dye is typically 0.1–10 ppm, but can actually be more or less than these amounts. For example, the amount can be many times 10 ppm, and the desired precipitate will be formed, but excess dye will be left unreacted and will be wasted. Also, amounts less than 0.1 ppm will cause some precipitation, and this may be sufficient in waste waters that are not badly discolored.

EXAMPLE 1

The waste water was scale-pit discharge water from a steel mill. This water contained red particles varying in size from about 0.2 microns up to several millimeters. The particles are various oxides and hydroxides of iron in various stages of oxidation. Let alone, the larger particles will settle, but the smaller particles will be left in suspension indefinitely and will give the water a characteristic deep red color. This waste water contained about 80 ppm filterable solids, plus 120 ppm dissolved salts, and had a pH of 7.3.

Two liters of the waste water were treated in a 4-liter glass container. To this sample, 0.004 gms of methylene blue was added to provide 0.2 ppm methylene blue in the water. This amount of dye used alone completely flocculated the red particles. The liquid cleared within about 2 hours to give a sediment in the bottom of the vessel and a clear blue-tinted supernatant liquid. In large scale operations the sediment is removed by conventional settling equipment well known to those skilled in the art.

EXAMPLE 2

The water treated in this example was tailing water from an iron ore mine in Canada. The particles varied in size from 0.2 microns up to several millimeters. After "settling" for 24 hours the supernatant liquid is still colored deep red, with a turbidity of 188 M.C.U. This waste water analyzed 130 ppm suspended solids, 70 ppm dissolved salts, and had a pH of 6.7.

In this example a mixture of quaternary ammonium salts was used as a preliminary cationic settling agent, followed by methylene blue. Onyx BTC-2125 was added to 2 liters of the waste water to provide 2.0 ppm active compound, and then methylene blue was added to provide 0.3 ppm of methylene blue. The mixture rapidly flocculated the red particles, leaving a pale blue supernatant liquid with an optical density of 0.03 (light path 1.0 cm – 650 wave length). Onyx BTC-2125 (Onyx Chemical Co.) is a mixture of alkyl dimethyl ethylbenzyl ammonium chloride and alkyl dimethyl benzyl ammonium chloride, in which the alkyl is $C_{12}$–$C_{18}$.

EXAMPLE 3

Following the procedure of Example 2, and treating the same mine water, 0.080 gms of aluminum sulfate was added to 2 liters of waste water to provide 40 ppm of aluminum sulfate followed by 0.006 g of malachite green, to provide 0.3 ppm of malachite green. Results similar to those obtained in Example 2 were noted.

When aluminum sulfate is used in such ancillary treatment, I prefer a dosage of 5–300 ppm in the waste water.

EXAMPLE 4

A 10 GPM pilot plant was operated for four days at a second mine site producing a "red water" waste. The plant consisted of a flash mixing system where 3 to 10 ppm of a series of commercial synthetic cationic polymers such as Sta-lok 1302 (a modified cationic starch, A. E. Staley Mfg. Co.), Magnifloc 573C (a polyamine, American Cyanamid Co.), Cat-floc T (diallyl dimethyl ammonium chloride, Calgon Corp.), and Hercofloc 863 (a polyamine, Hercules, Inc.), were added to different samples of the red water. After the flash mixing, 0.3 to 0.8 ppm of malachite green was added after which the waste water entered a 120 minute retention time slow flow and settling zone. The treated water was drawn off the top by gravity flow from the final settling zone.

Operating dosages were quickly adjusted to provide an acceptable quality effluent. The incoming water had 145 ppm of suspended solids and was the characteristic red color. The water leaving the settling zone averaged 23 ppm suspended solids and had a light blue grey color. Water samples were periodically withdrawn from the pilot plant effluent line and were allowed to settle for 10 hours. In all cases, the suspended were less than 1 ppm and the water had a light blue color.

EXAMPLE 5

Samples of water were withdrawn from the pilot plant described in Example 4. The samples were taken from a point after the addition of the 0.3 – 0.8 ppm malachite green. To each of these samples a series of commercial grade anionic polyacrylamide polymers such as Magnifloc 835A, Separan MG700, Hercofloc 833, and Percol 156, was added as 0.5% active solution. A dosage of 0.2 ppm was added, followed by 60 seconds of rapid manual stirring. The anionic polyacrylamide polymers provided rapid settling and a light blue clear supernatant within 10 minutes.

In pretreatments, I prefer organic polymers in an amount sufficient to provide a dosage level of 0.2 to 25 ppm. In post treatment processes, I prefer organic anionic polymers in an amount to provide a dosage level of 0.05 to 1.0 ppm.

I claim:

1. The method of clarifying iron waste waters containing red iron-containing particles suspended therein comprising adding thereto an effective amount of a dye selected from the group consisting of basic blue and green dyes, thereby to flocculate the particles, and recovering a clarified correspondingly blue or green tinted water.

2. The method according to claim 1 in which a synthetic organic cationic polymer is used as a pretreatment additive in an amount sufficient to provide a dosage level of 0.2 to 25 ppm in the waste water.

3. The method according to claim 1 in which a synthetic organic anionic polymer is used as a post treatment additive in an amount to provide a dosage rate of 0.05 ppm to 1.0 ppm in the waste water.

4. The method of clarifying iron waste waters containing red iron-containing particles suspended therein in an amount of about 80–145 ppm, comprising adding thereto an effective amount of a dye selected from the group consisting of methylene blue and malachite green, thereby to flocculate the particles, and recovering a clarified correspondingly blue or green tinted water.

5. The method according to claim 4 in which the group member is malachite green, added in an amount sufficient to provide 0.1 to 10 ppm in the waste water.

6. The method according to claim 5 in which aluminum sulfate is also added in an amount sufficient to provide 5 to 300 ppm in the waste water.

7. The method according to claim 4 in which the group member is methylene blue, added in an amount sufficient to provide 0.1 to 10 ppm.

8. The method according to claim 7 in which a quaternary ammonium salt is also added in a pretreatment in an amount sufficient to provide 0.2 to 25 ppm.

* * * * *